(12) United States Patent
Ding et al.

(10) Patent No.: US 10,231,465 B2
(45) Date of Patent: Mar. 19, 2019

(54) CONTINUOUS ON-BOARD PROCESSING OF SEAFOOD AFTER FISHING ON THE SEA

(71) Applicant: ZHEJIANG UNIVERSITY OF TECHNOLOGY, Hangzhou, Zhejiang (CN)

(72) Inventors: Yuting Ding, Zhejiang (CN); Xuxia Zhou, Zhejiang (CN); Shulai Liu, Zhejiang (CN); Jianhua Liu, Zhejiang (CN); Fei Lv, Zhejiang (CN); Shanping Chen, Zhejiang (CN); Peicheng Zhao, Zhejiang (CN); Jianyou Zhang, Zhejiang (CN); Saiqi Gu, Zhejiang (CN); Xia Xu, Zhejiang (CN); Zhicheng Zheng, Zhejiang (CN)

(73) Assignee: Zhejiang University of Technology, Hangzhou, Zhejiang (CN)

( * ) Notice: Subject to any disclaimer, the term of this patent is extended or adjusted under 35 U.S.C. 154(b) by 0 days.

(21) Appl. No.: 15/944,401

(22) Filed: Apr. 3, 2018

(65) Prior Publication Data
US 2018/0332865 A1    Nov. 22, 2018

Related U.S. Application Data

(63) Continuation of application No. 15/597,737, filed on May 17, 2017.

(51) Int. Cl.
*A22C 29/02* (2006.01)
*B01D 61/42* (2006.01)
(Continued)

(52) U.S. Cl.
CPC .............. *A22C 29/02* (2013.01); *A23L 5/13* (2016.08); *A23L 5/19* (2016.08); *A23L 17/40* (2016.08);
(Continued)

(58) Field of Classification Search
CPC ......... A22C 29/00; A22C 29/02; A22C 29/04; A22C 29/043; A22C 29/046
(Continued)

(56) References Cited

U.S. PATENT DOCUMENTS 3,962,752 A * 6/1976 Cooke .................... A22C 29/00
                                                                                     452/8
5,542,877 A * 8/1996 Taylor .................... A22C 9/00
                                                                                     452/1
(Continued)

*Primary Examiner* — Richard T Price, Jr.
(74) *Attorney, Agent, or Firm* — Muncy, Geissler, Olds & Lowe, P.C.

(57) ABSTRACT

The present invention relates to a continuous on-board drying method for Antarctic krill and a continuous on-board processing method of shelled Antarctic krill. The drying method includes the following steps: 1) subjecting fishing materials to cleaning, sorting, and dewatering with a vibrating screen; 2) rapidly heating the krill to the temperature of up to 70° C. using infra-red rays; 3) hot-air drying; 4) impurity removal by vacuum; 5) cooling to obtain dried krill. The processing method includes the following steps: a) subjecting fishing materials to cleaning, sorting, and dewatering with a vibrating screen; b) rapidly heating the krill to the temperature of up to 70° C. using infra-red rays; c) hot-air drying; d) subjecting the dried krill to shelling treatment to separate shell from meat, to obtain shelled krill; e) impurity removal by vacuum to obtain shelled krill product. The methods in the present invention are highly efficient, energy saving, green and environmental protection, and the krill products have high quality and safety.

10 Claims, 1 Drawing Sheet

(51) Int. Cl.
*B01D 61/16* (2006.01)
*B01D 61/14* (2006.01)
*B01D 61/02* (2006.01)
*B01D 61/04* (2006.01)
*B01D 61/58* (2006.01)
*F26B 3/04* (2006.01)
*A23L 5/10* (2016.01)
*A23L 17/40* (2016.01)
*C02F 103/22* (2006.01)
*C02F 103/08* (2006.01)
*C02F 103/00* (2006.01)
*B63B 35/14* (2006.01)
*C02F 9/00* (2006.01)
*F26B 1/00* (2006.01)

(52) U.S. Cl.
CPC .......... *B01D 61/027* (2013.01); *B01D 61/04* (2013.01); *B01D 61/142* (2013.01); *B01D 61/16* (2013.01); *B01D 61/422* (2013.01); *B01D 61/58* (2013.01); *F26B 3/04* (2013.01); *A22C 29/021* (2013.01); *A23V 2002/00* (2013.01); *A23V 2250/082* (2013.01); *A23V 2250/126* (2013.01); *A23V 2250/154* (2013.01); *A23V 2250/1582* (2013.01); *A23V 2250/1614* (2013.01); *A23V 2250/1618* (2013.01); *A23V 2250/21* (2013.01); *A23V 2250/214* (2013.01); *A23V 2250/2132* (2013.01); *A23V 2250/60* (2013.01); *A23V 2300/06* (2013.01); *A23V 2300/31* (2013.01); *A23V 2300/34* (2013.01); *A23V 2300/38* (2013.01); *B63B 35/14* (2013.01); *C02F 9/005* (2013.01); *C02F 2103/008* (2013.01); *C02F 2103/08* (2013.01); *C02F 2103/22* (2013.01); *C02F 2301/08* (2013.01); *F26B 1/00* (2013.01); *F26B 2200/16* (2013.01)

(58) Field of Classification Search
USPC ........................................................ 452/1–20
See application file for complete search history.

(56) References Cited

U.S. PATENT DOCUMENTS 7,179,160 B2\* 2/2007 Hulin .................. A22C 29/005
452/2
7,871,314 B2\* 1/2011 Jabbour ................ A22C 29/00
452/8
9,033,772 B2\* 5/2015 Maynard ............. A22C 29/046
452/13

\* cited by examiner

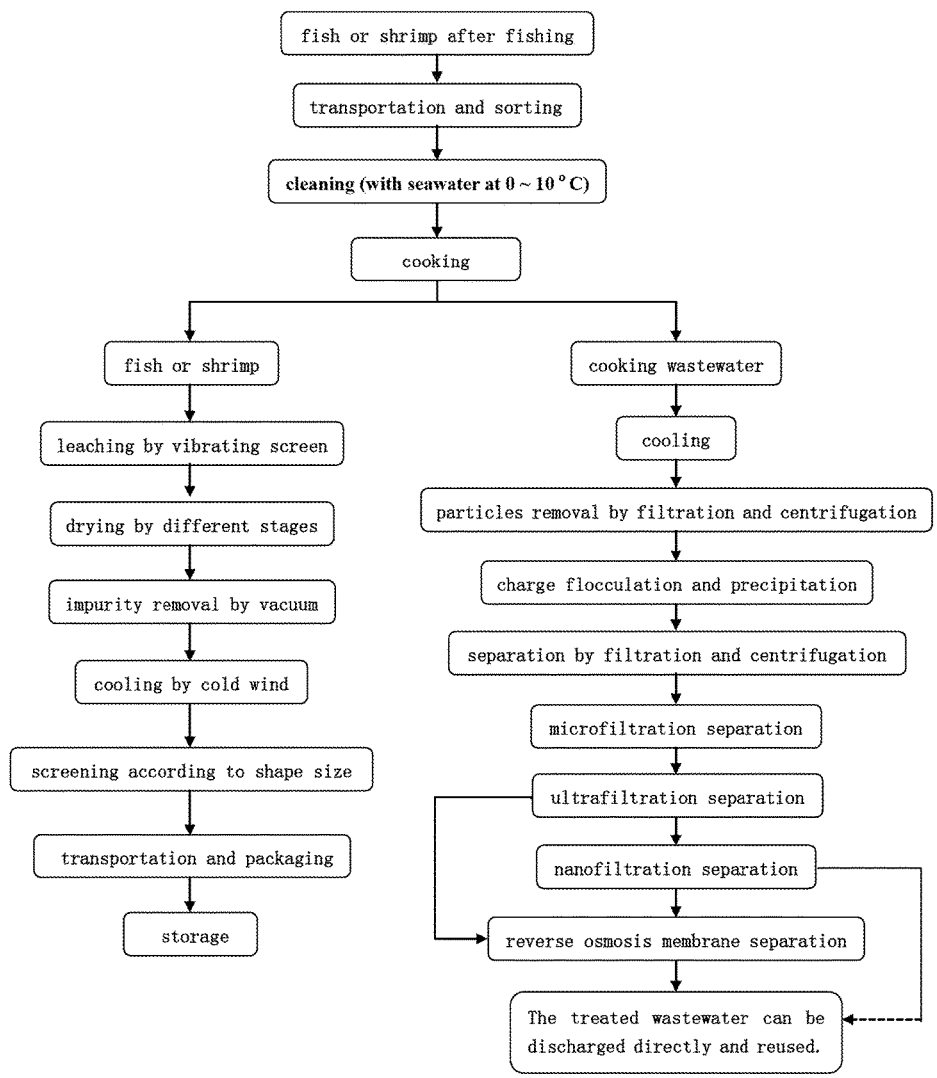

CONTINUOUS ON-BOARD PROCESSING OF SEAFOOD AFTER FISHING ON THE SEA

CROSS-REFERENCE TO RELATED APPLICATIONS

This application is a continuation of U.S. application Ser. No. 15/597,737, filed May 17, 2017, which is hereby incorporated by reference in its entirety.

TECHNICAL FIELD OF THE INVENTION

The present invention relates to a method of continuous on-board processing of seafood after fishing on the sea, specifically relates to a method of continuous on-board processing of seafood, and high efficient and energy-saving processing of its wastewater on the sea.

BACKGROUND OF THE INVENTION

For a long time, the production of seafood adopts the following traditional ways: firstly, marine fishing; secondly, salting processing or ice preservation and transportation; finally, traditional processing on the land. There is a strong seasonality of marine resources such as fish and shrimp. Especially for the polar resource, Antarctic krill, is small-size, easy to be deteriorated, and hard to preserve. According to the traditional production ways for seafood, the products have several problems such as low-fresh raw materials, quality decrease after processing (high-content of TVB-N, colour decrease, etc.). The innovative on-board fishing and processing model provides a best way solving these problems. This model not only keeps the freshness for raw materials by solving the problems of easy to be deteriorated and hard to transport and preserve for fish and shrimp, but also cuts the cost for transportation and shortens the time for processing. This model realizes a continuous on-board value-adding processing way.

In the continuous on-board processing, the wastewater (cooking soup) produced from heat treatment for fish and shrimp contains abundant nutrients and flavor compounds such as proteins, polypeptides, amino acids, carbohydrates, and nucleic acids. Due to technical restriction, these cooking soups with high COD and BOD value are discharged directly without any treatment, which would induce water eutrophication, leading to a high risk for red tide phenomenon.

Membrane separation includes the processing of reverse osmosis, nanofiltration, ultrafiltration and microfiltration, etc. The experimental research indicates that the cooking soup treated via membrane separation not only recycles all the dissolved substances, but also makes the water filtrated by membrane reuse in production. This research lays a solid foundation for the continuous on-board large-scale processing.

BRIEF SUMMARY

To solve the problems such as low freshness processing on the land, and quality and safety decrease for seafood, the present invention provides a method of continuous on-board processing of seafood after fishing on the sea, which can keep the freshness for raw materials, increase products quality, and keep products safety.

The present invention adopts the following technical solution to solve the technical problems:

a method of continuous on-board processing of seafood after fishing on the sea, which comprises the following steps:

1) after fishing of seafood materials, cleaning the seafood materials with seawater of 0~10° C., wherein the seafood materials are fish or shrimp;

2) cooking the fish or shrimp for 2~8 min in a cooking soup comprising a quality improver, wherein the solid-liquid ratio is 1 kg: 8~20 L, and the cooking soup comprising the quality improver is composed of salt 0~6% (w/w), edible alcohol 0.1~3% (w/w), glucono-delta-lactone 0.05~0.5% (w/w), tea polyphenol 0.02~0.2% (w/w), *perilla* juice 0.01~0.1% (w/w), sodium hexametaphosphate 0.05~0.25% (w/w), and water; during the cooking, the cooking soup is replaced at a fixed time (preferably every 2 hours), and the replaced cooking soup is heat processing wastewater, which should be treated to become more suitable for environment;

3) putting the cooked fish or shrimp onto vibrating screen, leaching and dewatering it;

4) putting the processed fish or shrimp evenly onto conveyor belt to go into a multilayer (preferably 3- to 9-layer) hot-air drying cabinet, and drying it until the moisture content of the fish or shrimp falls below 40% (w/w);

5) removing impurities such as small antennas mixing in the dried fish or shrimp obtained in step 4) by vacuum;

6) cooling the fish or shrimp obtained in step 5) by cold wind to decrease the temperature to not more than 10° C., thereby obtaining dried fish or shrimp product.

Further, the method of continuous on-board processing of seafood after fishing on the sea includes a step as follows: 7) screening: screening the dried fish or shrimp product according to the shape size.

More further, the method of continuous on-board processing of seafood after fishing on the sea includes a step as follows: 8) packaging and storage: subjecting the screened dried fish or shrimp to packaging according to its specifications and then to storing at room or cold temperature.

In step 2) mentioned above, after leached on a stainless steel net, the cooked fish or shrimp is put onto a vibrating screen with vibrating frequency of 300~1150 r/min (the optimal is 750 r/min), to remove the water droplets on the fish or shrimp.

In step 4) mentioned above, the drying includes the following three stages:

stage one: the drying temperature is controlled between 50° C. and 60° C., the drying air velocity is between 1.2 m/s and 3.5 m/s, and the drying time is between 5 min to 15 min;

stage two: the drying temperature is controlled between 65° C. and 75° C., the drying air velocity is between 0.8 m/s to 2.3 m/s, and the drying time is between 10 min and 25 min;

stage three: the drying temperature is controlled between 55° C. and 65° C.; the drying air velocity is between 0.5 m/s to 2.0 m/s; and the drying time is between 8 min and 15 min.

In step 5) mentioned above, impurities such as small antennas mixing in dried fish or shrimp are removed by vacuum, and relative vacuum degree is controlled at −15 kPa~−80 kPa. If the relative vacuum degree is less than −15 kPa, impurities such as small antennas cannot be removed. If the relative vacuum degree is more than 80 kPa, the impurities and the fish or shrimp would be all removed, therefore the purpose of separation can not be achieved.

In step 6) mentioned above, the fish or shrimp obtained in step 5) is cooled by cold wind at a temperature of −5~5° C. for 1~15 min, to rapidly decrease the temperature to not more than 10° C.

Further, the method of continuous on-board processing of seafood after fishing on the sea includes the high efficient and energy-saving treatment of the replaced cooking soup, which is carried out as follows:

(a) the replaced cooking soup (i.e., the cooking wastewater) produced in step 2) is cooled down to 0~70° C., the cooled cooking wastewater is subjected to filtration or centrifugation to remove the suspended substances, then a flocculant is added and stirred for 5~60 min, and then the resulted floccule is removed by filtration or centrifugation; wherein the flocculant is diatomite, and the addition amount of the diatomite is 50~1000 mg/L;

(b) microfiltration treatment: a microfiltration membrane with aperture of 0.1~2 μm is used for filtration of the cooking wastewater obtained in step (a), and a permeate solution "a" is obtained;

(c) ultrafiltration treatment: a ultrafiltration membrane with aperture of 10000~100000 Da is used for filtration of the permeate solution "a", and a permeate solution "b" is obtained;

(d) purification treatment: the permeate solution "b" is subjected to one of the following treatments: ① nanofiltration treatment: the permeate solution "b" flows into a nanofiltration membrane device with aperture of 90~1000 Da, and is subjected to filtration under conditions of 0.5~2 MPa and 0~70° C. to obtain a permeate solution "c", and the solution "c" can be recycled or discharged directly; ② reverse osmosis treatment: the permeate solution "b" flows into a reverse osmosis device, and is subjected to reverse osmosis treatment under conditions of 1~6 MPa and 0~70° C. to obtain a permeate solution "d", and the solution "d" can be recycled or discharged directly.

More further, in step (a) mentioned above, the pH of the cooking wastewater is adjusted to 4.0~5.5 before the addition of the flocculant. The optimal option for adjusting pH is using citric acid or acetic acid.

More further, in step (b) mentioned above, the membrane for microfiltration is ceramic microfiltration membrane with aperture of 0.22 μm, and the running pressure and temperature are 0.2 MPa and 20~50° C., respectively.

More further, in step (c) mentioned above, the aperture of the ultrafiltration membrane is 50000 Da, and the running pressure and temperature are 0.6 MPa and 20~40° C., respectively.

More further, in step (d) mentioned above, the aperture of the nanofiltration membrane is below 200 Da, and the running pressure and temperature are 1.5 MPa and 20~40° C., respectively.

More further, in step (d) mentioned above, the membrane for reverse osmosis is cellulose triacetate (CTA) membrane with aperture of 5~10 nm, and the running pressure and temperature are 2.5 MPa and 20~40° C., respectively.

More further, in step (d) mentioned above, if the salt content of the solution before reverse osmosis treatment is over 2.5%, the solution has to be subjected to electrodialysis treatment due to high osmotic pressure of itself. The electrodialysis device adopted in the present invention consists of 8 cation and 7 anion membranes placed at regular intervals. Both of the cation and anion membrane are homogeneous membrane, optimally provided by Zhejiang Circle-tech Membrane Technology Co., Ltd. with cation membrane CMX and anion membrane AMX. These membranes have the following properties such as high desalting efficiency, strong limiting current (I=6.5 A), less loss of soluble proteins (25.55%) and free amino acids (13.77%), which makes them suitable for desalting by electrodialysis treatment for the cooking wastewater from fish or shrimp.

What's more, the present invention establishes a prediction model for predicting the desalting ratio by electrodialysis treatment, with this model, the desalting ratio can be effectively predicted:

$$P = 1 - \left( \frac{\theta e - \frac{\alpha E t^{5/3} Q^{2/3}}{N}}{\theta - \vartheta + \vartheta e - \frac{\alpha E t^{5/3} Q^{2/3}}{N}} \right)^2$$

wherein α is obtained by SPSS software regression fitting, it can be calculated with flow rate, voltage and feed concentration according to the following formula:

$$\alpha = 1.766 \times 10^{-7} C_0 + 2.213 \times 10^{-7} E + 1.476 \times 10^{-7} Q - 7.657 \times 10^{-6}$$

$C_0$ is feed concentration (mol/m$^3$); θ is ionic limiting molar conductivity of NaCl solution; $\vartheta$ ismolar conductivity of NaCl; Q is flow rate (m$^3$/h); t is time for electrodialysis treatment (h); E is dc voltage (V); N is the number of pairs for cation and anion membrane; and e is mathematic constant, and the value is 2.71828.

The permeate solutions "a", "b", "c" and "d" described in the present invention are permeate solutions produced in different filtration treatments. These letters "a", "b", "c" and "d" following the permeate solutions are used for distinguishing the permeate solutions produced in different filtration treatments and themselves have no meanings.

Compared with the traditional technologies, the advantages of the present invention are as follows:

1. The present invention provides a method that is suitable for continuous on-board processing of seafood after fishing on the sea. The method adopts the formulation with a new quality improver, which can effectively keep the colour, flavor, texture and quality of the processed fish or shrimp. Accordingly, the present technology has a promising value for popularization and application.

2. The protein flocculation technology is adopted in the present invention to pre-treat the cooking wastewater, which effectively decreases the concentration polarization, enhances running time for membrane, decreases washing times for membrane, and prolongs the usage of membrane.

3. The electrodialysis technology is used for desalting for the cooking wastewater in the present invention. For the specific electrodialysis device, a prediction model for the desalting ratio by electrodialysis treatment is established. According to this model, the desalting ratio can be effectively predicted.

4. The present invention effectively solves the problem of discharging of the wastewater produced by on-board heat processing on the sea, and reduces the environmental pollution. The water after treatment can be discharged directly or recycled for usage. The present invention provides a "green" processing method for some sea areas such as Antarctic area.

FIG. 1 describes the flow chart of the method of continuous on-board processing of seafood after fishing on the sea.

DETAILED DESCRIPTION

The present invention is further described with examples together with the FIGURE. However, the protection range of the present invention is not limited to the examples.

The electrodialysis device adopted in the present invention consists of a membrane stack of 8 cation and 7 anion membranes placed at regular intervals. Both of the cation membrane CMX and anion membrane AMX are provided by Zhejiang Circle-tech Membrane Technology Co., Ltd.

Example 1

Referring to FIG. 1, a continuous on-board processing of fish or shrimp after fishing on the sea is executed as follows:

1) Cleaning and sorting of fishing shrimp: The fresh and live shrimp is cleaned by seawater, sorted. The temperature of seawater is controlled between 0° C. to 10° C.

2) Cooking: 2000 L of cooking soup containing a quality improver are put into a cooking tank. The cooking soup containing the quality improver is composed of edible alcohol (2 kg, produced by Jiangsu Donghai Shuntai Alcohol Co. Ltd.), glucono-delta-lactone (1 kg), tea polyphenol (4 kg), perilla juice (2 kg, produced by Zhejiang Shizi Bio-tech Co. Ltd.), hexametaphosphate (5 kg), and water. The cooking soup in the tank is heated until the temperature is up to 90° C. The shrimp is added into the tank to cook for 6 min, with the purpose of inactivation of enzyme (mainly endogenous proteases), reduction of microorganism, and meat dewatering. The solid-liquid ratio is controlled at 1:10. The cooking soup is replaced with new one every 2 hours. The replaced cooking soup (i.e., heat processing wastewater) should be treated to become more suitable for environment.

3) After leached on a stainless steel net, the cooked shrimp is put onto a vibrating screen with a vibrating frequency of 750 r/min, to remove the water droplets on the shrimp.

4) Drying: the shrimp is put evenly onto conveyor belt to go into a 7-layer hot-air drying cabinet for gradually drying: stage one: the drying temperature is controlled at 60° C., the drying air velocity is 2.6 m/s, and the drying time is 5 min; stage two: the drying temperature is controlled at 65° C., the drying air velocity is 1.0 m/s, and the drying time is 25 min; stage three: the drying temperature is controlled at 60° C., the drying air velocity is 0.8 m/s, and the drying time is 15 min.

5) Impurity removal by vacuum: Impurities such as small antennas mixing in dried shrimp are removed by vacuum at a relative vacuum degree of −15 kPa.

6) Cooling: the shrimp is put into a cooling cabinet at −5° C. for 3 min. The temperature of the shrimp decreased rapidly to 0~10° C. The dried shrimp product is obtained.

7) Screening: The dried shrimp product is screened according to the shape size.

8) Packaging and storage: the screened dried shrimp is subjected to packaging according to its specifications and then to storing at −18° C.

The dried shrimp obtained according to the method mentioned above displays natural colour, uniform texture, and original flavor and taste.

Example 2

1) 200 kg of clove fish are cleaned by seawater, and sorted. The temperature of seawater is controlled between 0° C. and 10° C.

2) 1000 L of cooking soup containing a quality improver are put into cooking tank. The cooking soup containing the quality improver is composed of salt (60 kg), edible alcohol (2 kg, produced by Jiangsu Donghai Shuntai Alcohol Co. Ltd.), glucono-delta-lactone (4.5 kg), tea polyphenol (200 g), perilla juice (1 kg, produced by Zhejiang Shizi Bio-tech Co. Ltd.), hexametaphosphate (500 g) and water. The cooking soup in the tank is heated until the temperature is up to 100° C. The clove fish (200 kg) is added into the tank to cook for 2 min. The cooking soup is replaced with new one every 2 hours. The replaced cooking soup (i.e., heat processing wastewater) should be treated to become more suitable for environment.

3) After leached on a stainless steel net, the cooked clove fish is put onto a vibrating screen with vibrating frequency of 750 r/min, to remove the water droplets on the clove fish.

4) Drying: the clove fish is put evenly onto conveyor belt to go into a 7-layer hot-air drying cabinet for gradually drying: stage one: the drying temperature is controlled at 60° C., the drying air velocity is 1.5 m/s, and the drying time is 5 min; stage two: the drying temperature is controlled at 75° C., the drying air velocity is 2.0 m/s, and the drying time is 10 min; stage three: the drying temperature is controlled at 60° C., the drying air velocity is 2.0 m/s, and the drying time is 12 min. The moisture content of the final dried clove fish is controlled not more than 40%.

5) Impurity removal by vacuum: Impurities mixing in the dried clove fish are removed by vacuum at a relative vacuum degree of −80 kPa.

6) Cooling: the clove fish is put into a cooling cabinet at −5° C. for 3 min. The temperature of the clove fish decreased rapidly to 0~10° C. The dried clove fish product is obtained.

7) Screening: The dried clove fish product is screened according to the shape size.

8) Packaging and storage: the screened dried clove fish is subjected to packaging according to its specifications and then to storing at −18° C.

The dried clove fish obtained according to the method mentioned above displays natural colour, uniform texture, and original flavor and taste.

Example 3

1) 250 kg of acete chinensis with 2 cm length are cleaned by seawater, and sorted. The temperature of seawater is controlled within 0~10° C.

2) the acete chinensis is brought into cooking tank with a bucket elevator. 2000 L of cooking soup containing a quality improver is put into cooking tank. The cooking soup containing the quality improver is composed of salt (50 kg), edible alcohol (6 kg, produced by Jiangsu Donghai Shuntai Alcohol Co. Ltd.), glucono-delta-lactone (5 kg), tea polyphenol (2 kg), perilla juice (1 kg, produced by Zhejiang Shizi Bio-tech Co. Ltd.), hexametaphosphate (5 kg), and water. The cooking soup in the tank is heated to 98° C. and maintained for 4 min. The cooking soup is replaced with new one every 2 hours. The replaced cooking soup (i.e., heat processing wastewater) should be treated to become more suitable for environment.

3) After leached on a stainless steel net, the cooked acete chinensis is put onto a vibrating screen with vibrating frequency of 750 r/min, to remove the water droplets on the acete chinensis.

4) the acete chinensis is put evenly onto conveyor belt to go into a 7-layer hot-air drying cabinet for gradually drying: stage one: the drying temperature is controlled at 60° C., the drying air velocity is 2.5 m/s, and the drying time is 15 min; stage two: the drying temperature is controlled at 70° C., the drying air velocity is 2.0 m/s, and the drying time is 20 min; stage three: the drying temperature is controlled at 60° C., the drying air velocity is 1.5 m/s, and the drying time is 15 min. The moisture content of the final dried acete chinensis is 22%.

In the present example, the steps 5) to 8) are the same to Example 1.

The dried acete chinensis obtained according to the method mentioned above displays natural colour, uniform texture, and original flavor and taste.

Example 4

1) 300 kg of clove fish with 2 cm length are cleaned by seawater, and sorted. The temperature of seawater is controlled between 0° C. and 10° C.

2) 3000 L of cooking soup containing a quality improver are put into a cooking tank. The cooking soup containing the quality improver is composed of salt (9 kg), edible alcohol (15 kg, produced by Jiangsu Donghai Shuntai Alcohol Co. Ltd.), glucono-delta-lactone (6 kg), tea polyphenol (3 kg), perilla juice (2.4 kg, produced by Zhejiang Shizi Bio-tech Co. Ltd.), hexametaphosphate (3 kg), and water. 300 kg of clove fish with 2 cm length are put into the cooking soup in the tank. The cooking soup is heated to 95° C. and maintained for 4.5 min. The cooking soup is replaced with new one every 2 hours. The replaced cooking soup (i.e., heat processing wastewater) should be treated to become more suitable for environment.

3) After leached on a stainless steel net, the cooked clove fish is put onto a vibrating screen with vibrating frequency of 750 r/min, to remove the water droplets on the clove fish.

4) The clove fish after dewatering is put evenly onto conveyor belt to go into 7-layer hot-air drying cabinet, the drying parameters are controlled as follows: stage one: the drying temperature is controlled at 60° C., the drying air velocity is 1.2 m/s, and the drying time is 8 min; stage two: the drying temperature is controlled at 70° C., the drying air velocity is 2.2 m/s, and the drying time is 15 min; stage three: the drying temperature is controlled at 60° C., the drying air velocity is 2.0 m/s, and the drying time is 15 min.

In the present example, the steps 5) to 8) are the same to Example 2.

The dried clove fish obtained according to the method mentioned above displays natural colour, uniform texture, and original flavor and taste.

Example 5

During the processing mentioned above, a huge number of cooking wastewater is produced. The cooking wastewater contains abundant nutrients and flavor compounds such as polypeptides, amino acids, carbohydrates, and nucleic acids.

1) Cooling and removal of suspended substances: An aliquot of 2000 L of cooking wastewater from shrimp in Example 1 is cooled down to 55° C., and then filtered by a cloth bag.

2) Flocculation and precipitation: The pH of the filtrated cooking wastewater is adjusted by citric acid or acetic acid to 5.5. Then 800 g of flocculant (i.e. diatomite, produced by Kunming Shuixiao Sci-tech Co. Ltd.) are added. The waste is stirred for 8 min and standing for 10 min until the floccule appears.

3) Centrifugation and separation: The precipitate is obtained by centrifugation separation with a centrifuge (DBSDH5, Yixing Haide Separation Machinery Co. Ltd.). The supernatant is cooking wastewater after pre-treatment, with the salt content of 1.44 g/100 mL, the amino acid nitrogen content of 20.15 mg/100 mL, and the soluble protein content of 1.46 mg/100 mL.

4) Microfiltration separation: The ceramic membrane with aperture of 0.22 μm is used for microfiltration membrane. 1800 L of the cooking wastewater after pre-treatment is subjected to microfiltration with the running pressure and temperature of 0.2 MPa and 25~30° C., respectively. The permeate solution after microfiltration treatment flows into the ultrafiltration device.

5) Ultrafiltration separation: The ultrafiltration membrane with aperture of 50000 Da is used, and the running pressure and temperature are 0.6 MPa and 25~30° C., respectively. The permeate solution after ultrafiltration treatment flows into the nanofiltration device.

6) Nanofiltration separation: The nanofiltration membrane device with aperture of 90 Da is used for nanofiltrate the permeate solution after ultrafiltration treating, and the operation pressure and temperature are 1.5 MPa and 25~30° C., respectively. The permeate and retention solutions are obtained. The retention solution has the salt content of 1.67 g/100 mL, the amino acid nitrogen content of 152.4 mg/100 mL, and the soluble protein content of 10.77 mg/100 mL. Compared with the cooking wastewater after pre-treatment, the cooking wastewater is concentrated by around 7 times. The treated permeate solution can be reused for shrimp cooking, to achieve recycling usage standard.

Example 6

1) Cooling and removal of suspended substances: 2000 L of cooking wastewater from clove fish in Example 2 are cooled down to 40° C., and then filtrated by a cloth bag.

2) Flocculation and precipitation: The pH of the filtrated cooking wastewater is adjusted by citric acid to 4.8. Then 800 g of flocculant (diatomite, produced by Kunming Shuixiao Sci-tech Co. Ltd.) are added. The wastewater is stirred for 8 min and standing for 10 min until floccule appears.

3) Centrifugation and separation: The precipitate is obtained by centrifugation separation with a centrifuge (DBSDH5, Yixing Haide Separation Machinery Co. Ltd.). The supernatant is cooking wastewater after pre-treatment, with the salt content of 3.22 g/100 mL, the amino acid nitrogen content of 32.71 mg/100 mL, and the soluble protein content of 4.1 mg/100 mL.

4) Microfiltration separation: The ceramic membrane with aperture of 0.22 μm is used for microfiltration separation. 1800 L of the cooking wastewater after pre-treatment are subjected to microfiltration with the running pressure and temperature of 0.2 MPa and 25~30° C., respectively. The permeate solution after microfiltration treatment flows into the ultrafiltration device.

5) Ultrafiltration separation: The ultrafiltration membrane with aperture of 50000 Da is used, and the running pressure and temperature are 0.6 MPa and 25~30° C., respectively. The permeate solution after ultrafiltration treatment flows into the electrodialysis device. The permeate solution after ultrafiltration has the salt content of 3.50 g/100 mL, the amino acid nitrogen content of 128.53 mg/100 mL, and the soluble protein content of 16.5 mg/100 mL. Compared with the cooking wastewater after pre-treatment, the cooking wastewater is concentrated by around 4 times.

6) The permeate solution after ultrafiltration is subjected to electrodialysis treatment. The parameters for electrodialysis treatment are as follows: temperature 20° C., current 3 A, flow rate 40 L/h. According to the prediction model for the desalting ratio, the desalting ratio is 85.3%. In the practical desalted solution after electrodialysis treatment, its salt content is 0.49 g/100 mL, and the desalting ratio is 86%. The result indicates the present invention of the prediction model for the desalting ratio can accurately predict the desalting ratio.

The desalted solution flows into reverse osmosis device, which adopts cellulose triacetate (CTA) membrane (produced by Japanese Toyobo Co. Ltd.) with aperture of 5~10 nm, and the running pressure and temperature of 2.5 MPa and 26° C., respectively. The permeate and retention solutions are obtained. The retention solution has the salt content of 2.83 g/100 mL, the amino acid nitrogen content of 190.53 mg/100 mL, and the soluble protein content of 13.2 mg/100 mL. Compared with the cooking wastewater after pre-treatment, the cooking wastewater is concentrated by around 6 times. The treated permeate solution can be discharged directly and reused.

Example 7

1) Cooling and removal of suspended substances: 2000 L of cooking wastewater from clove fish in Example 4 are cooled down to 25° C., and then filtrated by a cloth bag.

2) Flocculation and precipitation: The pH of the filtrated cooking wastewater is adjusted by acetic acid to 4.0. Then 800 g of flocculant (diatomite, produced by Kunming Shuixiao Sci-tech Co. Ltd.) are added. The wastewater is stirred for 8 min and standing for 10 min until floccule appears.

3) Centrifugation and separation: The precipitate is obtained by centrifugation separation with a centrifuge (DBSDH5, Yixing Haide Separation Machinery Co. Ltd.). The supernatant is cooking wastewater after pre-treatment, with the salt content of 3.8 g/100 mL, the amino acid nitrogen content of 41.25 mg/100 mL, and the soluble protein content of 3.4 mg/100 mL.

4) Microfiltration separation: The ceramic membrane with aperture of 0.22 μm is used for microfiltration. 1800 L of the cooking wastewater after pre-treatment are subjected to microfiltration with the running pressure and temperature of 0.2 MPa and 25~30° C., respectively. The permeate solution after microfiltration treatment flows into the ultrafiltration device.

5) Ultrafiltration separation: The ultrafiltration membrane with aperture of 50000 Da is used, and the running pressure and temperature are 0.6 MPa and 25~30° C., respectively. The permeate solution after ultrafiltration has the salt content of 3.8 g/100 mL, the amino acid nitrogen content of 40.6 mg/100 mL, and the soluble protein content of 3.1 mg/100 mL.

6) The permeate solution after ultrafiltration is subjected to a combined technology of electrodialysis and reverse osmosis treatment. The permeate solution after ultrafiltration treatment flows into the electrodialysis device. The parameters for electrodialysis treatment are as follows: temperature 20° C., current 3 A, flow rate 300 L/h. According to the prediction model for the desalting ratio, the desalting ratio is 86.2%. In practical desalted solution after electrodialysis treatment, its salt content is 0.54 g/100 mL, and the desalting ratio is 85.7%.

The desalted solution flows into a reverse osmosis device, which adopts cellulose triacetate (CTA) membrane (produced by Japanese Toyobo Co. Ltd.) with aperture of 5~10 nm, and the running pressure and temperature of 2.5 MPa and 20° C., respectively. The permeate and retention solutions are obtained. The retention solution has the salt content of 3.6 g/100 mL, the amino acid nitrogen content of 276.8 mg/100 mL, and the soluble protein content of 21.56 mg/100 mL. Compared with the cooking wastewater after pre-treatment, the cooking wastewater is concentrated by around 6.6 times. The treated permeate solution can be discharged directly.

What is claimed is:

1. A method of continuous on-board processing of seafood after fishing on the sea, comprising the following steps:

1) after fishing of seafood materials, cleaning the seafood materials with seawater of 0~10° C., wherein the seafood materials are fish or shrimp;
2) cooking the fish or shrimp for 2~8 min in a cooking soup comprising a quality improver, wherein the solid-liquid ratio is 1 kg: 8~20 L, and the cooking soup comprising the quality improver comprises salt 0~6% (w/w), edible alcohol 0.1~3% (w/w), glucono-delta-lactone 0.05~0.5% (w/w), tea polyphenol 0.02~0.2% (w/w), perilla juice 0.01~0.1% (w/w), sodium hexametaphosphate 0.05~0.25% (w/w), and water; during the cooking, the cooking soup is replaced at a fixed time, and the replaced cooking soup is heat processing wastewater, which should be treated to become more suitable for environment;
3) putting the cooked fish or shrimp onto a vibrating screen, leaching and dewatering the cooked fish or shrimp;
4) putting the processed fish or shrimp evenly onto conveyor belt to go into a multilayer hot-air drying cabinet, and drying the processed fish or shrimp until the moisture content of the fish or shrimp falls below 40% (w/w);
5) removing impurities mixing in the dried fish or shrimp obtained in step 4) by vacuum;
6) cooling the fish or shrimp obtained in step 5) by cold wind to decrease the temperature to not more than 10° C., thereby obtaining dried fish or shrimp product.

2. The method according to claim 1, further comprising a step as follows: 7) screening: the dried fish or shrimp product is screened according to the shape size.

3. The method according to claim 2, further comprising a step as follows: 8) the screened dried fish or shrimp is subjected to packaging according to its specifications and then to storing at room or cold temperature.

4. The method according to claim 1, which is characterized in that: the drying includes the following three stages:
stage one: the drying temperature is controlled between 50° C. and 60° C., the drying air velocity is between 1.2 m/s and 3.5 m/s, and the drying time is between 5 min to 15 min;
stage two: the drying temperature is controlled between 65° C. and 75° C., the drying air velocity is between 0.8 m/s and 2.3 m/s, and the drying time is between 10 min and 25 min;
stage three: the drying temperature is controlled between 55° C. and 65° C., the drying air velocity is between 0.5 m/s and 2.0 m/s, and the drying time is between 8 min and 15 min.

5. The method according to claim 1, which is characterized in that: in step 5), the relative vacuum degree is ranging from −15 kPa to −80 kPa.

6. The method according to claim 1, further comprising the treatment of the replaced cooking soup produced in step 2), which is carried out as follows:
(a) the replaced cooking soup (i.e., the cooking wastewater) produced in step 2) is cooled down to 0~70° C., the cooled cooking wastewater is subjected to filtration or centrifugation to remove the suspended substances, then a flocculant is added and stirred for 5~60 min, and then the resulted floccule is removed by filtration or centrifugation; wherein the flocculant is diatomite, and the addition amount of the diatomite is 50~1000 mg/L;
(b) microfiltration treatment: a microfiltration membrane with aperture of 0.1~2 μm is used for filtration of the cooking wastewater obtained in step (a), and a permeate solution "a" is obtained;

(c) ultrafiltration treatment: a ultrafiltration membrane with aperture of 10000~100000 Da is used for filtration of the permeate solution "a", and a permeate solution "b" is obtained;

(d) purification treatment: the permeate solution "b" is subjected to one of the following treatments: ① nanofiltration treatment: the permeate solution "b" flows into a nanofiltration membrane device with aperture of 90~1000 Da, and is subjected to filtration under conditions of 0.5~2 MPa and 0~70° C. to obtain a permeate solution "c", and the solution "c" can be recycled or discharged directly; ② reverse osmosis treatment: the permeate solution "b" flows into a reverse osmosis device, and is subjected to reverse osmosis treatment under conditions of 1~6 MPa and 0~70° C. to obtain a permeate solution "d", and the solution "d" can be recycled or discharged directly.

7. The method according to claim 6, which is characterized in that: in step (d), if the salt content of the solution before reverse osmosis treatment is over 2.5%, the solution has to be subjected to electrodialysis treatment, and then subjected to reverse osmosis treatment; the electrodialysis device consists of 8 cation and 7 anion membranes placed at regular intervals, and the cation and anion membranes are cation membrane CMX and anion membrane AMX, respectively.

8. The method according to claim 7, which is characterized in that: a prediction model for the desalting ratio by electrodialysis treatment is as follows:

$$P = 1 - \left( \frac{\theta e - \frac{\alpha E t^{5/3} Q^{2/3}}{N}}{\theta - \vartheta + \vartheta e - \frac{\alpha E t^{5/3} Q^{2/3}}{N}} \right)^2$$

wherein $\alpha$ is obtained by SPSS software regression fitting, and can be calculated with flow rate, voltage and feed concentration according to the following formula:

$$\alpha = 1.766 \times 10^{-7} C_0 + 2.213 \times 10^{-7} E + 1.476 \times 10^{-7} Q - 7.657 \times 10^{-6}$$

$C_0$ is feed concentration (mol/m³); $\theta$ is ionic limiting molar conductivity of NaCl solution; $\vartheta$ is molar conductivity of NaCl; Q is flow rate (m³/h); t is time for electrodialysis treatment (h); E is dc voltage (V); N is the number of pairs for cation and anion membrane; e is mathematic constant, and the value is 2.71828.

9. The method according to claim 6, which is characterized in that: in step (a), the pH of cooking wastewater is adjusted to 4.0~5.5 before the addition of the flocculant.

10. The method according to claim 6, which is characterized in that: in step (b), the membrane for microfiltration is ceramic microfiltration membrane with aperture of 0.22 μm, and the running pressure and temperature are 0.2 MPa and 20~50° C., respectively;

in step (c), the aperture of the ultrafiltration membrane is 50000 Da, and the running pressure and temperature are 0.6 MPa and 20~40° C., respectively;

in step (d), the aperture of the nanofiltration membrane is below 200 Da, and the running pressure and temperature are 1.5 MPa and 20~40° C., respectively;

in step (d), the membrane for reverse osmosis treatment is cellulose triacetate membrane with aperture of 5~10 nm, and the running pressure and temperature are 2.5 MPa and 20~40° C., respectively.

* * * * *

UNITED STATES PATENT AND TRADEMARK OFFICE
CERTIFICATE OF CORRECTION

PATENT NO. : 10,231,465 B2
APPLICATION NO. : 15/944401
DATED : March 19, 2019
INVENTOR(S) : Yuting Ding et al.

It is certified that error appears in the above-identified patent and that said Letters Patent is hereby corrected as shown below:

In (57) ABSTRACT, change:
"The present invention relates to a continuous on-board drying method for Antarctic krill and a continuous on-board processing method of shelled Antarctic krill. The drying method includes the following steps: 1) subjecting fishing materials to cleaning, sorting, and dewatering with a vibrating screen; 2) rapidly heating the krill to the temperature of up to 70.degree. C. using infra-red rays; 3) hot-air drying; 4) impurity removal by vacuum; 5) cooling to obtain dried krill. The processing method includes the following steps: a) subjecting fishing materials to cleaning, sorting, and dewatering with a vibrating screen; b) rapidly heating the krill to the temperature of up to 70.degree. C. using infra-red rays; c) hot-air drying; d) subjecting the dried krill to shelling treatment to separate shell from meat, to obtain shelled krill; e) impurity removal by vacuum to obtain shelled krill product. The methods in the present invention are highly efficient, energy saving, green and environmental protection, and the krill products have high quality and safety."

To:
--The present invention relates to a method of continuous on-board processing of seafood after fishing on the sea, which comprises the following steps: 1) after fishing of the fish or shrimp, cleaning them with seawater; 2) cooking the fish or shrimp for 2~8 min in a cooking soup comprising a quality improver; 3) putting the cooked fish or shrimp onto vibrating screen, leaching and dewatering it; 4) putting the processed fish or shrimp evenly onto conveyor belt to go into a multilayer hot-air drying cabinet, and drying it until the moisture content of the fish or shrimp falls below 40% (w/w); 5) removing impurities mixing in the dried fish or shrimp obtained in step 4) by vacuum; 6) cooling the fish or shrimp obtained in step 5) by cold wind to decrease the temperature to not more than 10° C., thereby obtaining dried fish or shrimp product.--

Signed and Sealed this
First Day of September, 2020

Andrei Iancu
*Director of the United States Patent and Trademark Office*